(12) United States Patent
Schroder (10) Patent No.: US 10,107,039 B2
(45) Date of Patent: Oct. 23, 2018

(54) HYBRID BIT WITH MECHANICALLY ATTACHED ROLLER CONE ELEMENTS

(71) Applicant: BAKER HUGHES INCORPORATED, Houston, TX (US)

(72) Inventor: Jon Schroder, The Woodlands, TX (US)

(73) Assignee: BAKER HUGHES INCORPORATED, Houston, TX (US)

( * ) Notice: Subject to any disclaimer, the term of this patent is extended or adjusted under 35 U.S.C. 154(b) by 555 days.

(21) Appl. No.: 14/720,189

(22) Filed: May 22, 2015

(65) Prior Publication Data

US 2015/0337603 A1 Nov. 26, 2015

Related U.S. Application Data (60) Provisional application No. 62/002,787, filed on May 23, 2014.

(51) Int. Cl.
| | |
|---|---|
| *E21B 10/14* | (2006.01) |
| *B23P 11/02* | (2006.01) |
| *E21B 10/20* | (2006.01) |
| *E21B 10/62* | (2006.01) |

(52) U.S. Cl.
CPC .............. *E21B 10/14* (2013.01); *B23P 11/02* (2013.01); *E21B 10/20* (2013.01); *E21B 10/62* (2013.01)

(58) Field of Classification Search
CPC .......... B23P 11/02; E21B 10/14; E21B 10/20; E21B 10/62; F16B 39/24
See application file for complete search history.

(56) References Cited

U.S. PATENT DOCUMENTS

| | | |
|---|---|---|
| 930,759 A | 8/1909 | Hughes |
| 1,388,424 A | 9/1921 | George |
| 1,394,769 A | 10/1921 | Sorensen |
| 1,519,641 A | 12/1924 | Thompson |
| 1,537,550 A | 5/1925 | Reed |
| 1,729,062 A | 9/1929 | Bull |
| 1,801,720 A | 4/1931 | Bull |
| 1,816,568 A | 7/1931 | Carlson |
| 1,821,474 A | 9/1931 | Mercer |
| 1,874,066 A | 8/1932 | Scott et al. |
| 1,879,127 A | 9/1932 | Schlumpf |

(Continued)

FOREIGN PATENT DOCUMENTS

| | | |
|---|---|---|
| DE | 1301784 | 8/1969 |
| EP | 0225101 | 6/1987 |

(Continued)

OTHER PUBLICATIONS

Wittman-Regis, A., International Preliminary Report on Patentability, The International Bureau of WIPO, dated Dec. 8, 2016.

(Continued)

*Primary Examiner* — James G Sayre
(74) *Attorney, Agent, or Firm* — TraskBritt (57) ABSTRACT

A modular hybrid drill bit is disclosed comprising a plurality of fixed blades and at least one rolling cutter assembly that is mechanically fastened to a bit body by a plurality of mechanical fasteners. The at least one rolling cutter assembly can be adjusted to change the axial and radial exposure of the rolling cutter elements.

24 Claims, 5 Drawing Sheets

(56) References Cited

U.S. PATENT DOCUMENTS

| | | |
|---|---|---|
| 1,896,243 A | 2/1933 | MacDonald |
| 1,932,487 A | 10/1933 | Scott |
| 1,990,007 A * | 2/1935 | Sperry .................... E21B 10/18 175/340 |
| 2,030,722 A | 2/1936 | Scott |
| 2,117,481 A | 5/1938 | Howard et al. |
| 2,119,618 A | 6/1938 | Zublin |
| 2,184,067 A | 12/1939 | Zublin |
| 2,198,849 A | 4/1940 | Waxler |
| 2,204,657 A | 6/1940 | Clyde |
| 2,216,894 A | 10/1940 | Stancliff |
| 2,244,537 A | 6/1941 | Kammerer |
| 2,297,157 A | 9/1942 | McClinton |
| 2,318,370 A | 5/1943 | Burch |
| 2,320,136 A | 5/1943 | Kammerer |
| 2,320,137 A | 5/1943 | Kammerer |
| 2,358,642 A | 9/1944 | Kammerer |
| 2,380,112 A | 7/1945 | Kinnear |
| 2,533,259 A | 6/1946 | Woods et al. |
| 2,520,517 A | 8/1950 | Taylor |
| 2,533,258 A | 12/1950 | Morlan et al. |
| 2,557,302 A | 6/1951 | Maydew |
| RE23,416 E | 10/1951 | Kinnear |
| 2,575,438 A | 11/1951 | Arthur et al. |
| 2,628,821 A | 2/1953 | Arthur et al. |
| 2,661,931 A | 12/1953 | Swart |
| 2,719,026 A | 9/1955 | Boice |
| 2,725,215 A | 11/1955 | MacNeir |
| 2,815,932 A | 12/1957 | Wolfram |
| 2,994,389 A | 8/1961 | Bus, Sr. |
| 3,010,708 A | 11/1961 | Hlinsky et al. |
| 3,039,503 A | 6/1962 | Mainone |
| 3,050,293 A | 8/1962 | Hlinsky |
| 3,055,443 A | 9/1962 | Edwards |
| 3,066,749 A | 12/1962 | Hildebrandt |
| 3,126,066 A | 3/1964 | Williams, Jr. |
| 3,126,067 A | 3/1964 | Schumacher, Jr. |
| 3,174,564 A | 3/1965 | Morlan |
| 3,239,431 A | 3/1966 | Raymond |
| 3,250,337 A | 5/1966 | Demo |
| 3,269,469 A | 8/1966 | Kelly, Jr. |
| 3,387,673 A | 6/1968 | Thompson |
| 3,397,751 A | 8/1968 | Reichmuth |
| 3,424,258 A | 1/1969 | Nakayama |
| 3,583,501 A | 6/1971 | Aalund |
| 3,760,894 A | 9/1973 | Pitifer |
| RE28,625 E | 11/1975 | Cunningham |
| 4,006,788 A | 2/1977 | Garner |
| 4,108,259 A | 8/1978 | Dixon et al. |
| 4,140,189 A | 2/1979 | Garner |
| 4,190,126 A | 2/1980 | Kabashima |
| 4,190,301 A | 2/1980 | Lachonius et al. |
| 4,187,922 A | 12/1980 | Phelps |
| 4,260,203 A | 4/1981 | Garner |
| 4,270,812 A | 6/1981 | Thomas |
| 4,285,409 A | 8/1981 | Allen |
| 4,293,048 A | 10/1981 | Kloesel, Jr. |
| 4,314,132 A | 2/1982 | Porter |
| 4,320,808 A | 3/1982 | Garrett |
| 4,343,371 A | 8/1982 | Baker, III et al. |
| 4,359,112 A | 11/1982 | Garner et al. |
| 4,359,114 A | 11/1982 | Miller et al. |
| 4,369,849 A | 1/1983 | Parrish |
| 4,386,669 A | 6/1983 | Evans |
| 4,408,671 A | 10/1983 | Munson |
| 4,410,284 A | 10/1983 | Herrick |
| 4,428,687 A | 1/1984 | Zahradnik |
| 4,444,281 A | 4/1984 | Schumacher, Jr. et al. |
| 4,448,269 A | 5/1984 | Ishikawa et al. |
| 4,456,082 A | 6/1984 | Harrison |
| 4,468,138 A | 8/1984 | Nagel |
| 4,527,637 A | 7/1985 | Bodine |
| 4,527,644 A | 7/1985 | Allam |
| 4,572,306 A | 2/1986 | Dorosz |
| 4,600,064 A | 7/1986 | Scales et al. |
| 4,627,882 A | 12/1986 | Soderstrom |
| 4,641,718 A | 2/1987 | Bengtsson |
| 4,657,091 A | 4/1987 | Higdon |
| 4,664,705 A | 5/1987 | Horton et al. |
| 4,690,228 A | 9/1987 | Voelz et al. |
| 4,706,765 A | 11/1987 | Lee et al. |
| 4,726,718 A | 2/1988 | Meskin et al. |
| 4,727,942 A | 3/1988 | Galle et al. |
| 4,729,440 A | 3/1988 | Hall |
| 4,738,322 A | 4/1988 | Hall et al. |
| 4,756,631 A | 7/1988 | Jones |
| 4,763,736 A | 8/1988 | Varel |
| 4,765,205 A | 8/1988 | Higdon |
| 4,802,539 A | 2/1989 | Hall et al. |
| 4,819,703 A | 4/1989 | Rice et al. |
| 4,825,964 A | 5/1989 | Rives |
| 4,865,137 A | 9/1989 | Bailey et al. |
| 4,874,047 A | 10/1989 | Hixon |
| 4,875,532 A | 10/1989 | Langford, Jr. |
| 4,880,068 A | 11/1989 | Bronson |
| 4,892,159 A | 1/1990 | Holster |
| 4,892,420 A | 1/1990 | Kruger |
| 4,915,181 A | 4/1990 | Labrosse |
| 4,932,484 A | 6/1990 | Warren et al. |
| 4,936,398 A | 6/1990 | Auty et al. |
| 4,943,488 A | 7/1990 | Sung et al. |
| 4,953,641 A | 9/1990 | Pessier |
| 4,976,324 A | 12/1990 | Tibbitts |
| 4,981,184 A | 1/1991 | Knowlton et al. |
| 4,984,643 A | 1/1991 | Isbell et al. |
| 4,991,671 A | 2/1991 | Pearce et al. |
| 5,016,718 A | 5/1991 | Tandberg |
| 5,027,912 A | 7/1991 | Juergens |
| 5,027,914 A | 7/1991 | Wilson |
| 5,028,177 A | 7/1991 | Meskin et al. |
| 5,030,276 A | 7/1991 | Sung et al. |
| 5,037,212 A | 8/1991 | Justman et al. |
| 5,049,164 A | 9/1991 | Horton et al. |
| 5,092,687 A | 3/1992 | Hall |
| 5,116,568 A | 5/1992 | Sung et al. |
| 5,137,097 A | 8/1992 | Fernandez |
| 5,145,017 A | 9/1992 | Holster et al. |
| 5,176,212 A | 1/1993 | Tandberg |
| 5,199,516 A | 4/1993 | Fernandez |
| 5,224,560 A | 7/1993 | Fernandez |
| 5,238,074 A | 8/1993 | Tibbitts et al. |
| 5,253,939 A | 10/1993 | Hall |
| 5,287,936 A | 2/1994 | Grimes et al. |
| 5,289,889 A | 3/1994 | Gearhart et al. |
| 5,337,843 A | 8/1994 | Torgrimsen et al. |
| 5,342,129 A | 8/1994 | Dennis et al. |
| 5,346,026 A | 9/1994 | Pessier et al. |
| 5,351,770 A | 10/1994 | Cawthorne et al. |
| 5,361,859 A | 11/1994 | Tibbitts |
| 5,429,200 A | 7/1995 | Blackman et al. |
| 5,439,067 A | 8/1995 | Huffstutler |
| 5,439,068 A | 8/1995 | Huffstutler et al. |
| 5,452,771 A | 9/1995 | Blackman et al. |
| 5,467,836 A | 11/1995 | Grimes et al. |
| 5,472,057 A | 12/1995 | Winfree |
| 5,472,271 A | 12/1995 | Bowers et al. |
| 5,494,123 A | 2/1996 | Nguyen |
| 5,513,715 A | 5/1996 | Dysart |
| 5,518,077 A | 5/1996 | Blackman et al. |
| 5,531,281 A | 7/1996 | Murdock |
| 5,547,033 A | 8/1996 | Campos, Jr. |
| 5,553,681 A | 9/1996 | Huffstutler et al. |
| 5,558,170 A | 9/1996 | Thigpen et al. |
| 5,560,440 A | 10/1996 | Tibbitts |
| 5,570,750 A | 11/1996 | Williams |
| 5,593,231 A | 1/1997 | Ippolito |
| 5,595,255 A | 1/1997 | Huffstutler |
| 5,606,895 A | 3/1997 | Huffstutler |
| 5,624,002 A | 4/1997 | Huffstutler |
| 5,641,029 A | 6/1997 | Beaton et al. |
| 5,644,956 A | 7/1997 | Blackman et al. |
| 5,655,612 A | 8/1997 | Grimes et al. |
| D384,084 S | 9/1997 | Huffstutler et al. |
| 5,695,018 A | 12/1997 | Pessier et al. |

(56) References Cited

U.S. PATENT DOCUMENTS

| | | | |
|---|---|---|---|
| 5,695,019 A | 12/1997 | Shamburger, Jr. |
| 5,755,297 A | 5/1998 | Young et al. |
| 5,839,526 A | 11/1998 | Cisneros et al. |
| 5,862,871 A | 1/1999 | Curlett |
| 5,868,502 A | 2/1999 | Cariveau et al. |
| 5,873,422 A | 2/1999 | Hansen et al. |
| 5,941,322 A | 8/1999 | Stephenson et al. |
| 5,944,125 A | 8/1999 | Byrd |
| 5,967,246 A | 10/1999 | Caraway et al. |
| 5,979,576 A | 11/1999 | Hansen et al. |
| 5,988,303 A | 11/1999 | Arfele |
| 5,992,542 A | 11/1999 | Rives |
| 5,996,713 A | 12/1999 | Pessier et al. |
| 6,045,029 A | 4/2000 | Scott |
| 6,068,070 A | 5/2000 | Scott |
| 6,092,613 A | 7/2000 | Caraway et al. |
| 6,095,265 A | 8/2000 | Alsup |
| 6,109,375 A | 8/2000 | Tso |
| 6,116,357 A | 9/2000 | Wagoner et al. |
| 6,170,582 B1 | 1/2001 | Singh et al. |
| 6,173,797 B1 | 1/2001 | Dykstra et al. |
| 6,190,050 B1 | 2/2001 | Campbell |
| 6,209,185 B1 | 4/2001 | Scott |
| 6,220,374 B1 | 4/2001 | Crawford |
| 6,241,034 B1 | 6/2001 | Steinke et al. |
| 6,241,036 B1 | 6/2001 | Lovato et al. |
| 6,250,407 B1 | 6/2001 | Karlsson |
| 6,260,635 B1 | 7/2001 | Crawford |
| 6,279,671 B1 | 8/2001 | Panigrahi et al. |
| 6,283,233 B1 | 9/2001 | Lamine et al. |
| 6,296,069 B1 | 10/2001 | Lamine et al. |
| RE37,450 E | 11/2001 | Deken et al. |
| 6,345,673 B1 | 2/2002 | Siracki |
| 6,360,831 B1 | 3/2002 | Akesson et al. |
| 6,367,568 B2 | 4/2002 | Steinke et al. |
| 6,386,302 B1 | 5/2002 | Beaton |
| 6,401,844 B1 | 6/2002 | Doster et al. |
| 6,405,811 B1 | 6/2002 | Borchardt |
| 6,408,958 B1 | 6/2002 | Isbell et al. |
| 6,415,687 B2 | 7/2002 | Saxman |
| 6,427,791 B1 | 8/2002 | Glowka |
| 6,427,798 B1 | 8/2002 | Imashige |
| 6,439,326 B1 | 8/2002 | Huang et al. |
| 6,446,739 B1 | 9/2002 | Richman et al. |
| 6,450,270 B1 | 9/2002 | Saxton |
| 6,460,635 B1 | 10/2002 | Kalsi et al. |
| 6,474,424 B1 | 11/2002 | Saxman |
| 6,510,906 B1 | 1/2003 | Richert et al. |
| 6,510,909 B2 | 1/2003 | Portwood et al. |
| 6,527,066 B1 | 3/2003 | Rives |
| 6,533,051 B1 | 3/2003 | Singh et al. |
| 6,544,308 B2 | 4/2003 | Griffin et al. |
| 6,561,291 B2 | 5/2003 | Xiang |
| 6,562,462 B2 | 5/2003 | Griffin et al. |
| 6,568,490 B1 | 5/2003 | Tso et al. |
| 6,581,700 B2 | 6/2003 | Curlett et al. |
| 6,585,064 B2 | 7/2003 | Griffin et al. |
| 6,589,640 B2 | 7/2003 | Griffin et al. |
| 6,592,985 B2 | 7/2003 | Griffin et al. |
| 6,601,661 B2 | 8/2003 | Baker et al. |
| 6,601,662 B2 | 8/2003 | Matthias et al. |
| 6,637,528 B2 | 10/2003 | Nishiyama et al. |
| 6,684,966 B2 | 2/2004 | Lin et al. |
| 6,684,967 B2 | 2/2004 | Mensa-Wilmot et al. |
| 6,729,418 B2 | 5/2004 | Slaughter, Jr. et al. |
| 6,739,214 B2 | 5/2004 | Griffin et al. |
| 6,742,607 B2 | 6/2004 | Beaton |
| 6,745,858 B1 | 6/2004 | Estes |
| 6,749,033 B2 | 6/2004 | Griffin et al. |
| 6,797,326 B2 | 9/2004 | Griffin et al. |
| 6,823,951 B2 | 11/2004 | Yong et al. |
| 6,843,333 B2 | 1/2005 | Richert et al. |
| 6,861,098 B2 | 3/2005 | Griffin et al. |
| 6,861,137 B2 | 3/2005 | Griffin et al. |
| 6,878,447 B2 | 4/2005 | Griffin et al. |
| 6,883,623 B2 | 4/2005 | McCormick et al. |
| 6,902,014 B1 | 6/2005 | Estes |
| 6,922,925 B2 | 8/2005 | Watanabe et al. |
| 6,986,395 B2 | 1/2006 | Chen |
| 6,988,569 B2 | 1/2006 | Lockstedt et al. |
| 7,096,978 B2 | 8/2006 | Dykstra et al. |
| 7,111,694 B2 | 9/2006 | Beaton |
| 7,128,173 B2 | 10/2006 | Lin |
| 7,137,460 B2 | 11/2006 | Slaughter, Jr. et al. |
| 7,152,702 B1 | 12/2006 | Bhome et al. |
| 7,197,806 B2 | 4/2007 | Boudreaux et al. |
| 7,198,119 B1 | 4/2007 | Hall et al. |
| 7,234,549 B2 | 6/2007 | McDonough et al. |
| 7,234,550 B2 | 6/2007 | Azar et al. |
| 7,270,196 B2 | 9/2007 | Hall |
| 7,281,592 B2 | 10/2007 | Runia et al. |
| 7,292,967 B2 | 11/2007 | McDonough et al. |
| 7,311,159 B2 | 12/2007 | Lin et al. |
| 7,320,375 B2 | 1/2008 | Singh |
| 7,341,119 B2 | 3/2008 | Singh |
| 7,350,568 B2 | 4/2008 | Mandal et al. |
| 7,350,601 B2 | 4/2008 | Belnap et al. |
| 7,360,612 B2 | 4/2008 | Chen et al. |
| 7,377,341 B2 | 5/2008 | Middlemiss et al. |
| 7,387,177 B2 | 6/2008 | Zahradnik et al. |
| 7,392,862 B2 | 7/2008 | Zahradnik et al. |
| 7,398,837 B2 | 7/2008 | Hall et al. |
| 7,416,036 B2 | 8/2008 | Forstner et al. |
| 7,435,478 B2 | 10/2008 | Keshavan |
| 7,458,430 B2 * | 12/2008 | Fyfe .................. E21B 10/633 175/325.4 |
| 7,462,003 B2 | 12/2008 | Middlemiss |
| 7,473,287 B2 | 1/2009 | Belnap et al. |
| 7,493,973 B2 | 2/2009 | Keshavan et al. |
| 7,517,589 B2 | 4/2009 | Eyre |
| 7,533,740 B2 | 5/2009 | Zhang et al. |
| 7,559,695 B2 | 7/2009 | Sexton et al. |
| 7,568,534 B2 | 8/2009 | Griffin et al. |
| 7,621,346 B1 | 11/2009 | Trinh et al. |
| 7,621,348 B2 | 11/2009 | Hoffmaster et al. |
| 7,647,991 B2 | 1/2010 | Felderhoff |
| 7,703,556 B2 | 4/2010 | Smith et al. |
| 7,703,557 B2 | 4/2010 | Durairajan et al. |
| 7,819,208 B2 | 10/2010 | Pessier et al. |
| 7,836,975 B2 | 11/2010 | Chen et al. |
| 7,845,435 B2 | 12/2010 | Zahradnik et al. |
| 7,845,437 B2 | 12/2010 | Bielawa et al. |
| 7,847,437 B2 | 12/2010 | Chakrabarti et al. |
| 7,992,658 B2 | 8/2011 | Buske |
| 8,028,769 B2 | 10/2011 | Pessier et al. |
| 8,056,651 B2 | 11/2011 | Turner |
| 8,177,000 B2 | 5/2012 | Bhome et al. |
| 8,201,646 B2 | 6/2012 | Vezirian |
| 8,302,709 B2 | 11/2012 | Bhome et al. |
| 8,356,398 B2 | 1/2013 | McCormick et al. |
| 8,950,514 B2 | 2/2015 | Buske |
| 2001/0000885 A1 | 5/2001 | Beuershausen et al. |
| 2001/0030066 A1 | 10/2001 | Clydesdale et al. |
| 2002/0092684 A1 | 7/2002 | Singh et al. |
| 2002/0100618 A1 | 8/2002 | Watson et al. |
| 2002/0108785 A1 | 8/2002 | Slaughter, Jr. et al. |
| 2004/0031625 A1 | 2/2004 | Lin et al. |
| 2004/0099448 A1 | 5/2004 | Fielder et al. |
| 2004/0238224 A1 | 12/2004 | Runia |
| 2005/0087370 A1 | 4/2005 | Ledgerwood, III et al. |
| 2005/0103533 A1 | 5/2005 | Sherwood, Jr. et al. |
| 2005/0167161 A1 | 8/2005 | Aaron |
| 2005/0178587 A1 | 8/2005 | Witman, IV et al. |
| 2005/0183892 A1 | 8/2005 | Oldham et al. |
| 2005/0252691 A1 | 11/2005 | Bramlett et al. |
| 2005/0263328 A1 | 12/2005 | Middlemiss |
| 2005/0273301 A1 | 12/2005 | Huang |
| 2006/0027401 A1 | 2/2006 | Nguyen |
| 2006/0032674 A1 | 2/2006 | Chen et al. |
| 2006/0032677 A1 | 2/2006 | Azar et al. |
| 2006/0162969 A1 | 7/2006 | Belnap et al. |
| 2006/0196699 A1 | 9/2006 | Estes et al. |
| 2006/0254830 A1 | 11/2006 | Radtke |
| 2006/0266558 A1 | 11/2006 | Middlemiss et al. |

(56) References Cited

U.S. PATENT DOCUMENTS

| | | |
|---|---|---|
| 2006/0266559 A1 | 11/2006 | Keeshavan et al. |
| 2006/0283640 A1 | 12/2006 | Estes et al. |
| 2007/0029114 A1 | 2/2007 | Middlemiss |
| 2007/0034414 A1 | 2/2007 | Singh et al. |
| 2007/0046119 A1 | 3/2007 | Cooley |
| 2007/0062736 A1 | 3/2007 | Cariveau et al. |
| 2007/0079994 A1 | 4/2007 | Middlemiss |
| 2007/0084640 A1 | 4/2007 | Singh |
| 2007/0131457 A1 | 6/2007 | McDonough et al. |
| 2007/0187155 A1 | 8/2007 | Middlemiss |
| 2007/0221417 A1 | 9/2007 | Hall et al. |
| 2007/0227781 A1 | 10/2007 | Cepeda et al. |
| 2007/0272445 A1 | 11/2007 | Cariveau |
| 2008/0028891 A1 | 2/2008 | Calnan et al. |
| 2008/0029308 A1 | 2/2008 | Chen |
| 2008/0066970 A1 | 3/2008 | Zahradnik et al. |
| 2008/0087471 A1 | 4/2008 | Chen et al. |
| 2008/0093128 A1 | 4/2008 | Zahradnik et al. |
| 2008/0156543 A1 | 7/2008 | McDonough et al. |
| 2008/0164069 A1 | 7/2008 | McDonough et al. |
| 2008/0264695 A1 | 10/2008 | Zahradnik et al. |
| 2008/0296068 A1 | 12/2008 | Zahradnik et al. |
| 2008/0308320 A1 | 12/2008 | Kolachalam |
| 2009/0044984 A1 | 2/2009 | Massey et al. |
| 2009/0114454 A1 | 5/2009 | Belnap et al. |
| 2009/0120693 A1 | 5/2009 | McClain et al. |
| 2009/0126998 A1 | 5/2009 | Zahradnik et al. |
| 2009/0159338 A1 | 6/2009 | Buske |
| 2009/0159341 A1 | 6/2009 | Pessier et al. |
| 2009/0166093 A1 | 7/2009 | Pessier et al. |
| 2009/0178855 A1 | 7/2009 | Zhang et al. |
| 2009/0178856 A1 | 7/2009 | Singh et al. |
| 2009/0183925 A1 | 7/2009 | Zhang et al. |
| 2009/0236147 A1 | 9/2009 | Koltermann et al. |
| 2009/0272582 A1 | 11/2009 | McCormick et al. |
| 2009/0283332 A1 | 11/2009 | Dick et al. |
| 2010/0012392 A1 | 1/2010 | Zahradnik et al. |
| 2010/0018777 A1 | 1/2010 | Pessier et al. |
| 2010/0043412 A1 | 2/2010 | Dickinson et al. |
| 2010/0155146 A1 | 6/2010 | Nguyen et al. |
| 2010/0224417 A1 | 9/2010 | Zahradnik et al. |
| 2010/0252326 A1 | 10/2010 | Bhome et al. |
| 2010/0276205 A1 | 11/2010 | Oxford et al. |
| 2010/0288561 A1 | 11/2010 | Zahradnik et al. |
| 2010/0319993 A1 | 12/2010 | Bhome et al. |
| 2010/0320001 A1 | 12/2010 | Kulkarni |
| 2011/0024197 A1 | 2/2011 | Centala et al. |
| 2011/0079440 A1 | 4/2011 | Buske et al. |
| 2011/0079441 A1 | 4/2011 | Buske et al. |
| 2011/0079442 A1 | 4/2011 | Buske et al. |
| 2011/0079443 A1 | 4/2011 | Buske et al. |
| 2011/0085877 A1 | 4/2011 | Osborne, Jr. |
| 2011/0162893 A1 | 7/2011 | Zhang |
| 2012/0111638 A1* | 5/2012 | Nguyen .................. E21B 10/00 175/336 |
| 2012/0205160 A1* | 8/2012 | Ricks ...................... E21B 10/14 175/331 |
| 2015/0152687 A1 | 6/2015 | Nguyen et al. |
| 2015/0197992 A1 | 7/2015 | Ricks et al. |

FOREIGN PATENT DOCUMENTS

| | | |
|---|---|---|
| EP | 0157278 | 11/1989 |
| EP | 0391683 | 1/1996 |
| EP | 0874128 | 10/1998 |
| EP | 2089187 | 8/2009 |
| GB | 2183694 | 6/1987 |
| GB | 2194571 | 3/1988 |
| GB | 2364340 | 1/2002 |
| GB | 2403313 | 12/2004 |
| JP | 2001-159289 | 6/2001 |
| JP | 2001159289 | 6/2001 |
| RU | 1331988 | 8/1987 |
| WO | 8502223 | 5/1985 |
| WO | 2008124572 | 10/2008 |
| WO | 2009135119 | 11/2009 |
| WO | 2010127382 | 11/2010 |
| WO | 2010135605 | 11/2010 |
| WO | 2015102891 | 7/2015 |

OTHER PUBLICATIONS

Thomas, S., International Search Report for International Patent Application No. PCT/US2015/014011, USPTO, dated Apr. 24, 2015.

Thomas, S., Written Opinion for International Patent Application No. PCT/US2015/014011, USPTO, dated Apr. 24, 2015.

Dantinne, P, International Search Report for International Patent Application No. PCT/US2015/032230, European Patent Office, dated Nov. 16, 2015.

Dantinne, P, Written Opinion for International Patent Application No. PCT/US2015/032230, European Patent Office, dated Nov. 16, 2015.

Baharlou, International Preliminary Report of Patentability for International Patent Application No. PCT/US2009/050672, The International Bureau of WIPO, dated Jan. 25, 2011.

Becamel, International Preliminary Report on Patentability for the International Patent Application No. PCT/US2010/039100, The International Bureau of WIPO, Switzerland, dated Jan. 5, 2012.

Beijer, International Preliminary Report on Patentability for International Patent Application No. PCT/US2009/042514 The International Bureau of WIPO, dated Nov. 2, 2010.

Buske, et al., "Performance Paradigm Shift: Drilling Vertical and Directional Sections Through Abrasive Formations with Roller Cone Bits", Society of Petroleum Engineers—SPE 114975 CIPC/SPE Gas Technology Symposium 2008 Joint Conference Canada, dated Jun. 16-19, 2008.

Choi, International Search Report for International Patent Application No. PCT/US2010/0039100, Korean Intellectual Property Office, dated Jan. 25, 2011.

Choi, Written Opinion for International Patent Application No. PCT/US2010/039100, Korean Intellectual Property Office, dated Jan. 25, 2011.

Dr. Wells, et al., "Bit Balling Mitigation in PDC Bit Design", International Association of Drilling Contractors/ Society of Petroleum Engineers—IADC/SPE 114673 IADC/SPE Asia Pacific Drilling Technology Conference and Exhibition Indonesia, dated Aug. 25-27, 2008.

Ersoy, et al., "Wear characteristics of PDC pin and hybrid core bits in rock drilling", Wear 188 Elsevier Science S.A., pp. 150-165, dated Mar. 1995.

George, et al., "Significant Cost Savings Achieved Through Out the Use of PDC Bits in Compressed Air/Foam Applications", Society of Petroleum Engineers—SPE 116118 2008 SPE Annual Technical Conference and Exhibition Denver, Colorado, dated Sep. 21-24, 2008.

Georgescu, Written Opinion for International Patent Application No. PCT/US2010/051020, European Patent Office dated Jun. 1, 2011.

Georgescu, International Search Report for International Patent Application No. PCT/US2010/050631, European Patent Office dated Jun. 10, 2011.

Georgescu, Written Opinion for International Patent Application No. PCT/US2010/050631, European Patent Office dated Jun. 10, 2011.

Georgescu, International Search Report for International Patent Application No. PCT/US2011/042437, European Patent Office dated Nov. 9, 2011.

Georgescu, Written Opinion for International Patent Application No. PCT/US2011/042437, European Patent Office dated Nov. 9, 2011.

Georgescu, International Search Report for International Patent Application No. PCT/US2010/051020, European Patent Office, dated Jun. 1, 2011.

(56) References Cited

OTHER PUBLICATIONS

Georgescu, International Search Report for International Patent Application No. PCT/US2010/051019, European Patent Office, dated Jun. 6, 2011.
Georgescu, Written Opinion for International Patent Application No. PCT/US2010/051019, European Patent Office, dated Jun. 6, 2011.
Georgescu, International Search Report for International Patent Application No. PCT/US2010/051017, European Patent Office, dated Jun. 8, 2011.
Georgescu, Written Opinion for International Patent Application No. PCT/US2010/051017, European Patent Office, dated Jun. 8, 2011.
Georgescu, International Search Report for International Patent Application No. PCT/US2010/051014, European Patent Office dated Jun. 9, 2011.
Georgescu, Written Opinion for International Patent Application No. PCT/US2010/051014, European Patent Office, dated Jun. 9, 2011.
Kang, International Search Report for International Patent Application No. PCT/US2010/033513, Korean Intellectual Property Office, dated Jan. 10, 2011.
Kang, Written Opinion for International Patent Application No. PCT/US2010/033513, Korean Intellectual Property Office, dated Jan. 10, 2011.
Kang, International Search Report for International Patent Application No. PCT/US2010/032511, Korean Intellectual Property Office, dated Jan. 17, 2011.
Kang, Written Opinion for International Patent Application No. PCT/US2010/032511, Korean Intellectual Property Office, dated Jan. 17, 2011.
Kim, International Search Report for International Patent Application No. PCT/US2009/067969, Korean Intellectual Property Office, dated May 25, 2010.
Kim, Written Opinion for International Patent Application No. PCT/US2009/067969, Korean Intellectual Property Office, dated May 25, 2010.
Lee, International Search Report for International Patent Application No. PCT/US2009/042514, Korean Intellectual Property Office dated Nov. 27, 2009.
Lee, Written Opinion for International Patent Application No. PCT/US2009/042514, Korean Intellectual Property Office dated Nov. 27, 2009.
Williams, et al., "An Analysis of the Performance of PDC Hybrid Drill Bits", SPE/IADC 16117, SPE/IADC Drilling Conference, pp. 585-594, dated Mar. 1987.
Lee, International Search Report for International Patent Application No. PCT/US2009/050672, Korean Intellectual Property Office dated Mar. 3, 2010.
Warren, et al., "PDC Bits: What's Needed to Meet Tomorrow's Challenge", SPE 27978, University of Tulsa Centennial Petroleum Engineering Symposium, pp. 207-214, dated Aug. 1994.
Lee, Written Opinion for International Patent Application No. PCT/US2009/050672, Korean Intellectual Property Office dated Mar. 3, 2010.
Tomlinson, et al., "Rock Drilling—Syndax3 Pins—New Concepts in PCD Drilling", Industrial Diamond Review, pp. 109-114, dated Mar. 1992.
Mills Machine Company, "Rotary Hole Openers—Section 8", Retrieved from the internet on May 7, 2009 using <URL: http://www.millsmachine.com/pages/home_page/mills_catalog/cat_holeopen/cat_holeopen.pdf>.
Ott, International Search Report for International Patent Application No. PCT/US2010/049159, European Patent Office, dated Apr. 21, 2011.
Ott, Written Opinion for International Patent Application No. PCT/US2010/049159, European Patent Office, dated Apr. 21, 2011.
Smith Services, "Hole Opener—Model 6980 Hole Opener", Retrieved from the internet on May 7, 2008 using <URL: http://www.siismithservices.com/b_products/product_page.asp?ID=589>.
Pessier, et al., "Hybrid Bits Offer Distinct Advantages in Selected Roller Cone and PDC Bit Applications", IADC/SPE Paper No. 128741, dated Feb. 2-4, 2010, pp. 1-9.
Schneiderbauer, International Search Report for International Patent Application No. PCT/US2012/024134, European Patent Office, dated Mar. 7, 2013.
Schneiderbauer, International Written Opinion for International Patent Application No. PCT/US2012/024134, European Patent Office, dated Mar. 7, 2013.
Schouten, International Search Report for International Patent Application No. PCT/US2008/083532 European Patent Office, dated Feb. 25, 2009.
Schouten, Written Opinion for International Patent Application No. PCT/US2008/083532, European Patent Office dated Feb. 25, 2009.
Sheppard, et al., "Rock Drilling—Hybrid Bit Success for Syndax3 Pins", Industrial Diamond Review, pp. 309-311, dated Jun. 1993.

\* cited by examiner

HYBRID BIT WITH MECHANICALLY ATTACHED ROLLER CONE ELEMENTS

CROSS REFERENCE TO RELATED APPLICATION

This application claims benefit of and priority to U.S. Provisional Application Ser. No. 62/002,787, filed on May 23, 2014, the entire contents of which are incorporated herein by reference for all purposes.

TECHNICAL FIELD

The invention disclosed and taught herein relates generally to hybrid drill bits having at least one fixed blade with cutter elements and at least one rolling cutter assembly and, more specifically, relates to a hybrid drill bit having a mechanically fastened rolling cutter assembly.

BACKGROUND

Rotary earth-boring bits useful for oil and gas exploration and production have evolved considerably since the bi-cone bit developed by Howard R. Hughes, Sr., which had two rotatable cone-shaped cutting assemblies. Today, there are rotary bits with fixed or non-rotating blades with polycrystalline diamond cutters (PDC) mounted thereon. There are also hybrid bits combining fixed-blade cutting elements and rotating cutting elements. Most, but not all hybrid bits are modular in construction, in that the rotatable or rolling cutter elements are separate components coupled to the bit body by welding or other type of fastening.

The embodiments disclosed and taught herein are directed to an improved modular hybrid drill bit having at least one rolling cutter assembly mechanically fastened to the bit body.

BRIEF SUMMARY

As a brief summary of one of the many embodiments of the present invention, a hybrid drill bit may comprise a body having at least one blade, each blade comprising a plurality of earth formation cutting elements; at least one rolling cutter assembly pocket formed into the body and comprising a first torque-reacting structure, wherein the pocket is disposed between adjacent blades; at least one rolling cutter assembly comprising a head onto which a cutter element is rotatably coupled; the head comprising a second torque-reacting structure configured to operatively engage the first torque-reacting structure, and a plurality of mechanical fastener openings; the plurality of mechanical fasteners fabricated from high-strength, high fracture toughness, corrosion-resistant metal alloy configured to securely and removably couple the at least one rolling cutter assembly to the pocket; a locking structure formed on a portion of at least one fastener and configured to provide an interference fit between the locking structure and an associated fastener opening in the head; a plurality of locking caps, each locking cap being configured to engage an exposed portion of a respective fastener and prevent relative rotation between the fastener and the locking cap; and a plurality of weldments engaging at least a portion of each locking cap and configured to prevent dislodgement of each cap from each respective fastener and to prevent relative rotation between each locking cap and the body.

BRIEF DESCRIPTION OF THE DRAWINGS

The following figures are included to further demonstrate and teach certain aspects of the present invention. The invention may be better understood by reference to one or more of these figures in combination with the detailed description of specific embodiments presented herein.

While the embodiments disclosed herein are susceptible to various modifications and alternative forms, only a few specific embodiments have been shown by way of example in the drawings and are described in detail below. The figures and detailed descriptions of these specific embodiments are not intended to limit the breadth or scope of the inventive concepts or the appended claims in any manner. Rather, the figures and detailed written descriptions are provided to illustrate the inventive concepts to a person of ordinary skill in the art and to enable such person to make and use the inventive concepts.

DETAILED DESCRIPTION

The figures identified above and the written description of specific structures and functions below are not presented to limit the scope of the present disclosure or the scope of the appended claims. Rather, the figures and written description are provided to teach any person skilled in the art how to make and use the invention for which patent protection is sought. Those skilled in the art will appreciate that not all features, aspects or functions of a commercial embodiment of the present disclosure are described or shown for the sake of clarity and understanding. Persons of skill in this art will also appreciate that the development of an actual commercial embodiment incorporating some or all aspects of the present disclosure will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the embodiments disclosed and taught herein are susceptible to numerous and various modifications and alternative forms. Lastly, the use of a singular term, such as, but not limited to, "a," is not intended as limiting of the number of items. Also, the use of relational terms, such as, but not limited to, "top," "bottom," "left," "right," "upper," "lower," "down," "up," "side," and the like, are used in the written description for clarity in specific reference to the figures and are not intended to limit the scope of the invention or the appended claims.

Disclosed herein is a modular, hybrid drill bit comprising a single or a plurality of fixed blades and at least one rolling cutter assembly, in which the rolling cutter assembly is secured to the bit body with mechanical fasteners. The rolling cutter assembly may be configured to mate with a pocket in the bit body and to engage anti-rotation or anti-movement structures, such as a tongue and groove system. Further, shims may be used between the rolling cutter assembly and the pocket or bit body to adjust the radial projection of the rolling cutter assembly and/or the axial projection of the rolling cutter assembly.

In a preferred embodiment, the mechanical fasteners comprise threaded fasteners fabricated from high-strength, high-toughness, corrosion-resistant metal alloy and extend radially outwardly from the pocket or bit body on to which the rolling cutter assembly is placed. Threaded nuts may engage the exposed threaded fastener threads and be tightened to clamp the rolling cutter assembly into the pocket. One or more of the threaded fasteners may have a locking structure, such as an interference fit, that will elastically or plastically deform the fastener opening in the rolling cutter assembly to secure the assembly in an axial position. The nuts may be welded in place to prevent loosening of the fasteners. Alternatively and preferably, locking caps configured to engage the nut landings may be placed over the exposed nuts and welded together and to the bit body or alternatively to a locking plate held down by the nuts eliminating welding to a head or bit body, to prevent loosening of the fasteners.

Figure 1:
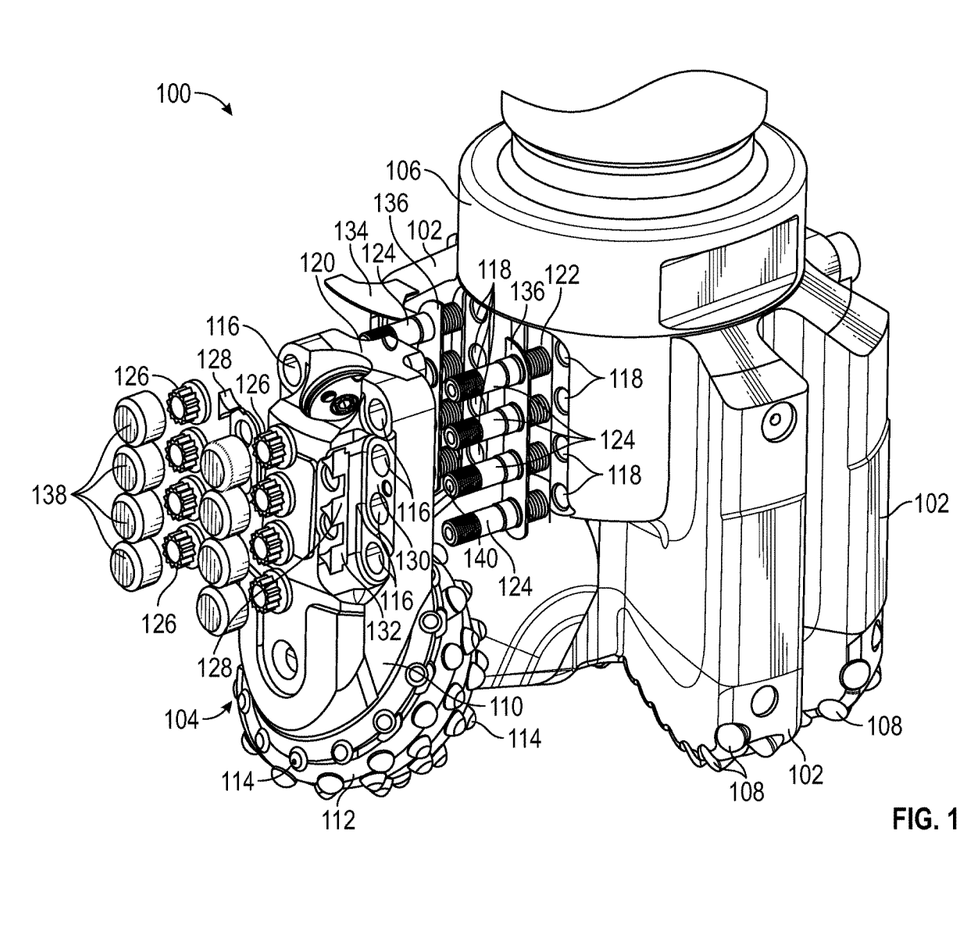
FIG. 1 illustrates in exploded view one of many possible embodiments of a modular hybrid drill bit with a rolling cutter assembly mechanically fastened to the bit body.

Turning now to FIG. 1, illustrated is an exploded view of one of many possible embodiments of a hybrid drill bit 100 comprising a plurality of fixed-cutter blades 102 and at least one rolling cutter assembly 104 mechanically and removably fastened to a bit body 106. As illustrated in FIG. 1 the fixed-cutter blades 102 may be, but are not required to be, fabricated integrally with the drill bit body 106. The rolling cutter assembly 104 is illustrated as a separate component that is mechanically and removably attached to a portion of the drill bit body 106, preferably between fixed-cutter blades 102.

The fixed-cutter blades 102 each have a plurality of cutting elements 108, such as, without limitation, polycrystalline diamond compact (PDC) cutting elements affixed thereto in known manner and location. The rolling cutter assembly 104 comprises a body or rolling cutter head 110 having a spindle 302 (FIG. 3) and a rolling cone 112 to which a plurality of cutting elements 114 are affixed in known manner and location.

The rolling cutter head 110 has a plurality of mechanical fastener openings 116 substantially corresponding with fastener openings 118 in the bit body 106. The rolling cutter head 110 preferably, but not necessarily, comprises anti-movement element 120 or tongue that engages a mating portion 122 of the body such as a groove or head pocket in the bit body 106.

As illustrated in FIG. 1, the rolling cutter head 110 may be mechanically coupled to the body 106 through use of a plurality of threaded fasteners 124. In a preferred embodiment, the threaded fasteners 124 comprise threaded fasteners having threaded portions at each end. The rolling cutter head 110 will be secured to the bit body 106 with nuts 126 that matingly engage with the threaded fasteners. Alternatively, threaded bolts having integral heads may be used. The preferred fasteners are discussed in more detail with respect to FIG. 4.

Also illustrated in FIG. 1 are optional locking plates 128. As illustrated, locking plate 128 engages a locking plate recess 130 in the rolling cutter head 110. The locking plate 128 illustrated in in FIG. 1 comprises three pillars 132, which are interposed between the nuts 126. As discussed with respect to FIG. 3, alternative locking plate configurations are contemplated.

The fastener openings 116 in the head and the corresponding openings in the bit body 106 may be, and preferably are, aligned along radial lines to a real or imaginary center of the body 106. Alternatively, the fastener openings 116, 118 may be aligned along non-radial chords into the bit body 106.

Figure 2:
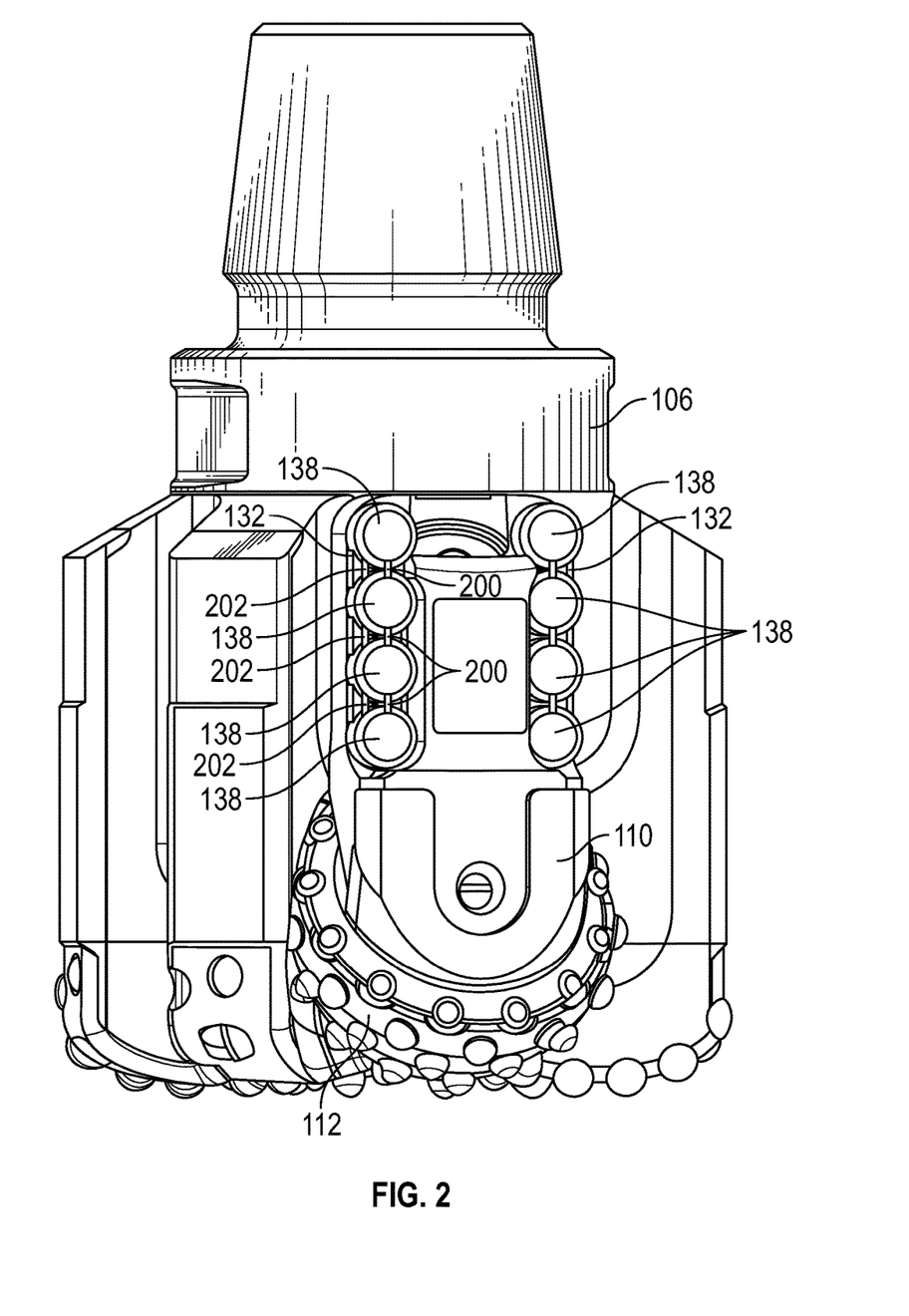
FIG. 2 illustrates the hybrid drill bit of FIG. 1 in an assembled view.

It will be appreciated that at least because of the variations in component sizes caused by manufacturing tolerances in both the bit body 106 and in the rolling cutter head 110, hybrid drill bit 100 may utilize spacers or shims to adjust the precise location of the rolling cutter head 110/rolling cutter cone 112 relative to the bit body 106, and most especially relative to the cutting element exposure. For example, as illustrated in FIGS. 1 and 2, one or more shims 134 may be placed between a top surface of the rolling cutter head 110 and a corresponding part in the bit body 106, as shown. It will be appreciated that the one or more shims 134 in this location will displace the rolling cutter head 110 in an axial direction, allowing adjustment of the exposure of the rolling cutting elements 114. Similarly, one or more shims 136 may be placed between the rolling cutter head 110 and the bit body 106 to space the rolling cutter head 110 away from the bit body 106 in a radial direction. Because of this adjustability, it is preferred that the fastener openings 116, 118 be oriented along radial lines as well.

Figure 3:
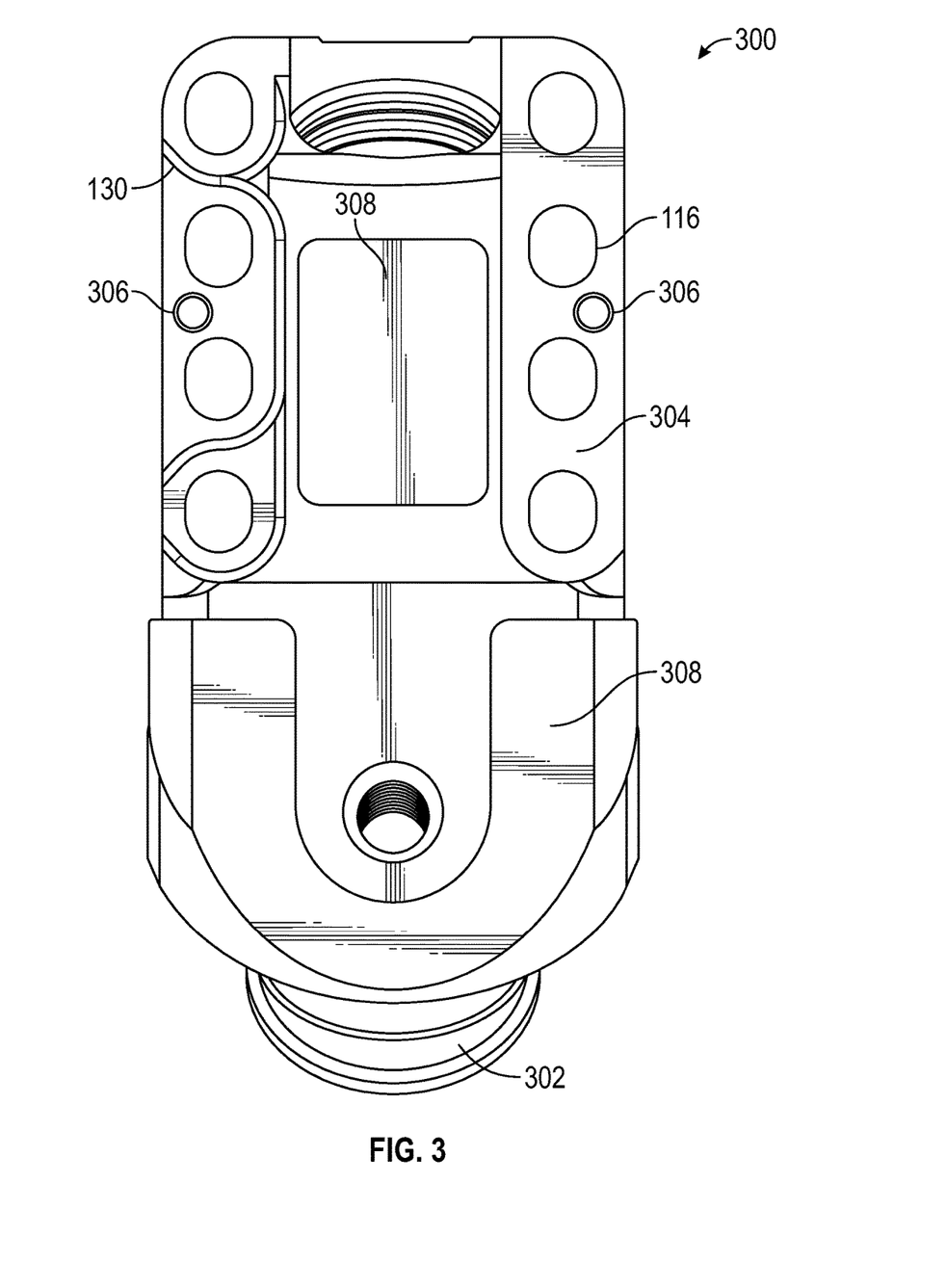
FIG. 3 illustrates one of many possible embodiments of a rolling cutter head.

As discussed in more detail with respect to FIG. 3, axial adjustment of the rolling cutter assembly 104 requires that the fastener openings 116 be elongated a sufficient amount to allow for axial adjustment.

As illustrated in FIGS. 1 and 2, the radial shims 136 may be held in place by the mechanical fasteners 124, 126. The axial shims 134, however, may be susceptible to movement or dislodging from their location between the rolling cutter head 110 and the bit body 106. It is contemplated that several different shim locking mechanisms may be employed to hold the axial shims 134 in place. For example, a recess may be formed in the rolling cutter head 110 surface to engage a protrusion on the axial shim 134 to prevent the axial shim 134 from dislodging from the drill bit 100.

Lastly, as illustrated in FIG. 1, this particular embodiment of the hybrid drill bit 100 utilizes locking caps 138 to prevent the fastener nuts 126 from loosening, as will be discussed below.

Turning to FIG. 2, the bit 100 of FIG. 1 is shown in an assembled condition. The mechanical fasteners 124, 126 have been tightened to the desired tension, and locking caps 138 have been installed on an exposed portion of the threaded fasteners 124, such as a nut or a bolt head. To prevent the threaded fasteners 124 from loosening during use of bit 100, a first series of tack welds 200 may be laid down along the top of the caps 138 and between adjacent caps to join each adjacent cap 138. Additionally, a series of tack welds 202 may be laid down securing the caps 138 to, preferably, the locking plates 128, such as at each pillar 132, or, alternatively, to the rolling cutter head 110. It will be appreciated that while welds 202 secure the caps 138 to the bit 100 and prevent loosening of threaded fasteners 124, such as nuts 126, welds 200 are useful to keep the caps 138 aligned prior to placing weld 202.

While eight fasteners are shown in the embodiments described in FIGS. 1 and 2, it will be appreciated that other numbers of fasteners may be used, including one fastener per rolling cutter assembly. It will be appreciated that the number of fasteners may vary from one to multiple depending on the configuration of the rolling cutter element and its material properties, the material properties of the body, and the material properties of the fastener(s) used. For the embodiments shown in FIGS. 1 and 2, only four fasteners are likely needed; specifically the two fasteners on either side at the top and bottom of the rolling cutter assembly. The two middle fasteners on each side are considered back-up fasteners in case of failure of one or more of the primary fasteners. It will be appreciated that spacing the primary fasteners as described maximizes the anti-rotation properties of the rolling cutter assembly.

FIG. 3 illustrates a rolling cutter head 300 suitable for use with the invention disclosed herein. Head 300 is similar to the rolling cutter head 110 described in FIG. 1, and shows rolling cone spindle 302 (not visible in FIG. 1). Head 300 is shown with the recess 130 configured to receive locking plate 128, as shown in FIG. 1. Alternatively, as shown in FIG. 3, the head 300 need not have a recess to utilize a locking plate, for example, the surface 304 may be substantially flat. To aid in removal of the head 300 or cutter assembly 104 from the bit body 106 after use (such as for repair), head 300 is illustrated with removal aid 306, which may be threaded holes to receive a tool for pulling the head 300 off of the body 106. Also illustrated in FIG. 3 are areas of hardfacing 308 that may be applied to the rolling cutter head 300, preferably, prior to assembly of the head 300 and prior to mating of the rolling cutter assembly on the bit body 106.

FIG. 3 also shows that the fastener openings 116 may be elongated circular holes rather than substantially circular holes. It will be appreciated that if axial adjustment of the rolling cutter assembly 104, 300 is desired, then fastener openings 116 may need to be elongated to allow for the axial movement of the assembly 104 relative to the bit body 106. Conversely, if no axial adjustment of the rolling cutter assembly 104 is desired, the fastener openings 116 may be circular or substantially circular and configured to mate with the mechanical fasteners with a sliding fit or location fit, as those terms are understood in the art. For example, if the desired amount of axial displacement or adjustment is about 0.070 inch, then the long axis $_{[BNB1]}$ of the elongated opening will need to be equal to or greater than 0.070 inch more than the diameter of a corresponding circular hole.

Figure 4:
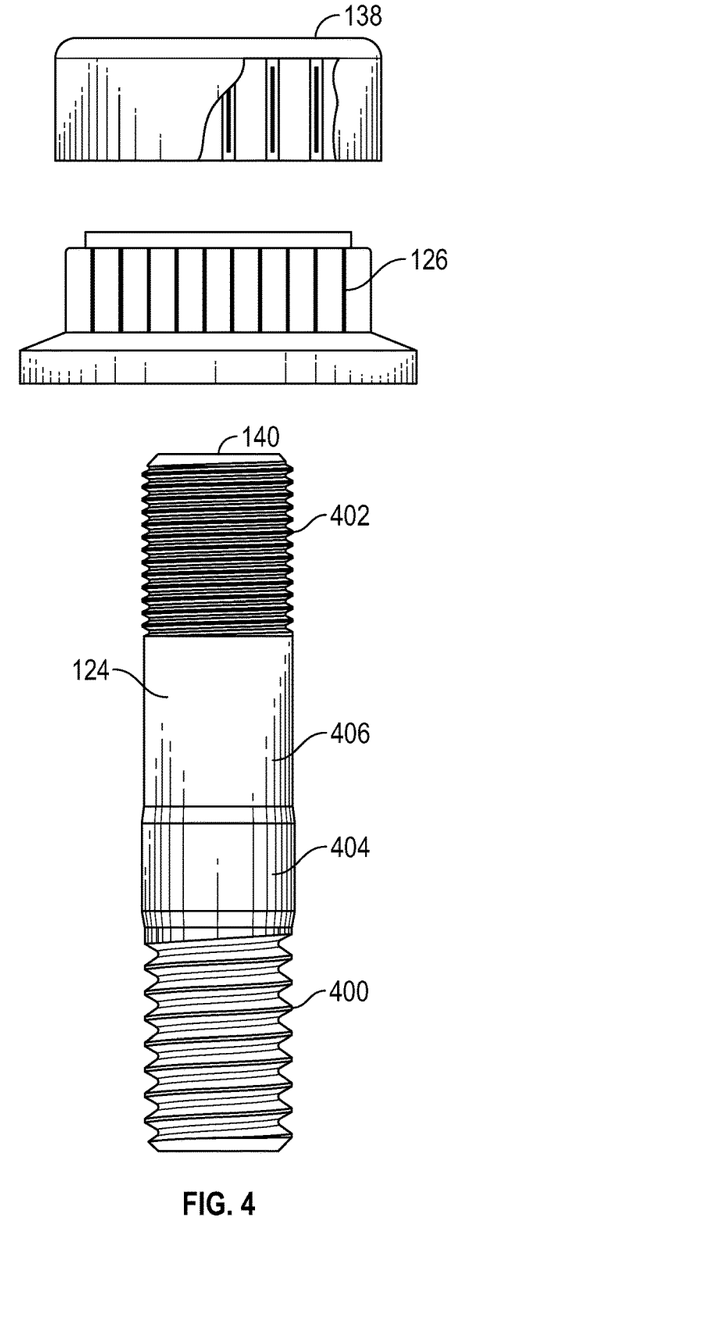
FIG. 4 illustrates one of many possible embodiments of a mechanical fastener system and locking cap.

Illustrated in FIG. 4 is an example of one of the many types of mechanical fastener systems that can be used with the present invention. The presently preferred mechanical fastener system comprises a threaded fastener 124 having threaded portions 400 and 402 at each end and an associated nut 126. In the particular embodiment described in this disclosure, this threaded fastener 124 may have a nominal diameter of 7/16 inch with an overall length of about 2 inches. As illustrated in FIG. 4, threaded portion 400 comprises a course series thread, such as a 7/16 inch-14 thread. The threaded portion 400 of the threaded fastener 124 is configured to mate with corresponding threads in threaded receptacles 118. The other end of the threaded fastener 124 may comprise a fine series thread, such as a 7/16 inch-20 thread. One reason for having a fine series thread on one end of the threaded fastener 124 is because the material properties of the bit body 106 likely will be substantially less than the material properties of this preferred mechanical fastener system. Use of a fine thread at threaded portion 402 at a distal end of the threaded fastener 124 to engage the nut 126 serves to reduce the possibility of overloading and stripping the course series threads at threaded portion 400 from the bit body.

It is preferred that the mechanical fasteners, for example, the threaded fasteners 124 and nuts 126 be fabricated from a corrosion-resistant, high-strength metal alloy material having a high-level of material toughness. For example, it is presently preferred that the mechanical fasteners be fabricated from a Nickel-bearing, heat-treatable alloy, such as INCONEL®, having a tensile strength of at least 260,000 psi. Mechanical fasteners of this type may be obtained from various commercial sources including, but not limited to, Automotive Racing Products, Inc. Threaded fasteners 124 and nuts 126 made by ARP from its Custom Age 625+® material have been used for prototypes of hybrid drill bit 100. It is preferred, but not required, that the threaded fasteners 124 and nuts 126 be fabricated from the same material.

To the extent a locking plate 128 is used with a particular hybrid bit embodiment, the material for the locking plate and for the locking caps 138 need not be, and preferably are not, made from the same material as the fasteners. In a preferred embodiment, the locking plate 128 material and the locking cap 138 material may be a conventional steel alloy, such as AISI 8620, or other metal alloy that provides ease of welding. Since the locking plate 128 and the locking cap 138 are not significant loadbearing components, strength and load corrosion-resistance is not as important as it is for the mechanical fasteners, which bear significant static and dynamic loads.

It will also be appreciated that the clamping force provided by the mechanical fasteners is an issue of design depending on the size of the bit 100, the environment anticipated and the materials from which the bit 100 are fabricated. For the embodiments illustrated in this application using eight 7/16 inch nominal mechanical fasteners for each rolling cutter assembly 104, it is desired to preload each fastener to about 21,000 pounds, or about 89% of its 0.02% offset yield load. Those of skill will appreciate it that determining the amount of fastener preload is typically done by controlling the amount of torque imposed on the nut 126. However, as is known, the relationship between torque and preload is not necessarily linear and is affected by a variety of factors, not the least of which is friction between the nut 126 and threaded fastener 124 threads. For example, it is been found that while 95 foot-pounds of torque applied to the nut can be calculated to generate 17,500 pounds of preload, it has been found that up to about 120 foot-pounds of torque was needed to achieve the same preload. This variation in calculated torque versus required torque was attributed to the friction between the threaded fastener and the nut both being fabricated from the same high-strength, high-toughness material.

As illustrated in FIG. 1, the threaded fastener 124 may also comprise a recessed hex head 140 or other type of drive system for installing and tightening (e.g., torquing) the threaded fastener 124 into the bit body 106 at threaded receptacles 118.

Also shown in FIG. 4 is an upset region 404 approximately 0.25 inch in length and having a diameter between about 0.017 and 0.019 inch greater than main body 406 of the fastener 124. This upset region 404 is configured to provide an interference type fit with the fastener openings 116 in the rolling cutter head 110. It will be appreciated that once the appropriate axial shims 134 are put in place, if needed, and the rolling cutter assembly 104 is put into position on the threaded fasteners 124, tightening down the nuts 126 causes mechanical deformation, either plastic or elastic, thereby locking the rolling cutter assembly 104 head in axial position on the bit body 106. If the threaded fastener 124 material is stronger (e.g., harder) than the material from which the rolling cutter head 110 is made, the softer material will deform substantially more than the harder upset region 404.

Figure 5:
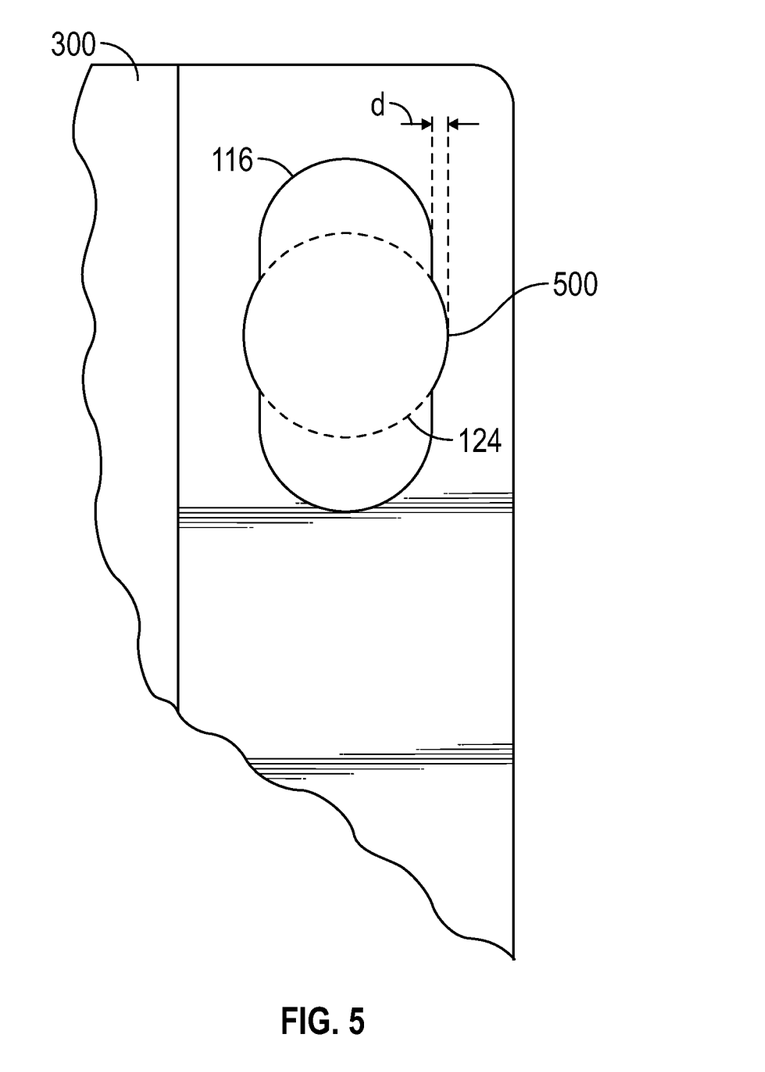
FIG. 5 illustrates a deformed fastener opening in a rolling cutter head.

FIG. 5 is an illustration of what a fastener opening 116 may look like after plastic deformation 500 caused by the upset region 404 on threaded fastener 124. The deformation on one side of the opening 116 is labeled "d" in FIG. 5. It can be appreciated from this illustration this interference fit and resulting deformation functions to help secure the rolling cutter assembly 104 in axial position on the bit body 106.

It will be appreciated that there are alternative embodiments of upset region 404 that may be used to advantage with the invention disclosed herein. For example, and without limitation, single or multiple protuberances such as diamond-shaped points may be used instead of the circumferential upset region 404 illustrated in FIG. 4. Alternatively, serrated ridges along a portion of threaded fastener 124 may be used to help secure the rolling cutter assembly 104 in axial position.

Now having benefit of this disclosure, it will be appreciated that a hybrid drill bit according to the present invention may be assembled as follows. If threaded fasteners are used as the mechanical fasteners, the threaded fasteners are placed in the threaded receptacles in the bit body and torqued to the desired level such as, for example, 75 foot-pounds torque. It will be appreciated that the appropriate torque level will depend on the fastener material, the bit body material and the clamping force necessary to achieve the desired stability of the rolling cutter assembly.

Radial and axial shims, if needed or desired, may be placed in position on the bit body or the rolling cutter assembly, as desired. The rolling cutter head may be placed in the desired axial and radial position on the bit body pocket so that the anti-rotation structures operatively engage each other. If threaded fasteners are used, the rolling cutter assembly is slid down the threaded fasteners. If bolts are used, the bolts are inserted into the fastener openings and screwed into the fastener receptacles in the bit body. If a fastener-locking plate is used, the plate is placed over the threaded fasteners, or placed in position before the bolts are run home.

Nuts are screwed on the threaded fasteners, if used, and each nut or bolt is torqued to the desired preload for each mechanical fastener. Once the fasteners are torqued to the appropriate level, locking caps may be placed over on the exposed position of each fastener, such as a nut or bolt head. A weld, such as a tack weld, may be laid-down between the top cap surfaces. This weld may function to prevent the caps, and, therefore, the nuts or bolt heads from loosening by rotating. Also, this weld may be beneficial in preventing the caps from canting when a side cap weld is laid down. To prevent the caps from dislodging from the bit, a weld, such as a tack weld, may be placed between the sides of each cap and between the material that contacts the underside of the nut or bolt head. It will be appreciated that when a locking plate is used, and it is made from the same material as the locking cap, a side weld may be easily placed in these regions. If a locking plate is not used, the side weld can still lock the caps to each other and to the rolling cutter head.

If the mechanically fastened rolling cutter assembly needs to be removed, such as for repair of the bit, the one or more locking cap welds can be ground off and the locking caps removed. The fasteners can be loosened and removed. To ease dismantling of the rolling cutter assembly from the bit body, a pulling tool may engage one or more threaded receptacles in the rolling cutter assembly and used to pull the rolling cutter assembly past the interference fit caused by the upset region of the mechanical fastener.

Other and further embodiments utilizing one or more aspects of the invention described above can be devised without departing from the spirit of invention. Further, the various methods and embodiments of the methods of manufacture and assembly of the system, as well as location specifications, can be included in combination with each other to produce variations of the disclosed methods and embodiments. Discussion of singular elements can include plural elements and vice-versa.

The order of steps can occur in a variety of sequences unless otherwise specifically limited. The various steps described herein can be combined with other steps, interlineated with the stated steps, and/or split into multiple steps. Similarly, elements have been described functionally and can be embodied as separate components or can be combined into components having multiple functions.

The invention has been described in the context of preferred and other embodiments and not every embodiment of the invention has been described. Obvious modifications and alterations to the described embodiments are available to those of ordinary skill in the art. The disclosed and undisclosed embodiments are not intended to limit or restrict the scope or applicability of the invention conceived of by the Applicants, but rather, in conformity with the patent laws, Applicants intend to fully protect all such modifications and improvements that come within the scope or range of equivalent of the following appended claims.

What is claimed is:

1. A hybrid drill bit comprising:
   a body having a plurality of blades, each blade comprising a plurality of earth formation cutting elements;
   at least one rolling cutter assembly pocket formed into the body and comprising a first torque-reacting structure, wherein the pocket is disposed between adjacent blades;
   at least one rolling cutter assembly comprising a head onto which a cutter element is rotatably coupled;
   the head comprising a second torque-reacting structure configured to operatively engage the first torque-reacting structure and a plurality of mechanical fastener openings;
   the head adjustably positioned axially and radially in the pocket to establish a predetermined rolling cutter exposure;
   a plurality of mechanical fasteners configured to securely and removably couple the at least one rolling cutter assembly to the pocket in the predetermined rolling cutter exposure position;
   a locking structure formed on a portion of at least one fastener and configured to provide an interference fit between the locking structure and an associated fastener opening in the head;
   a plurality of locking caps, each locking cap being configured to engage an exposed portion of a respective fastener to prevent relative rotation between the fastener and the locking cap; and
   a plurality of weldments engaging at least a portion of each locking cap, the plurality of weldments configured to prevent dislodgment of each locking cap from the respective fastener and to prevent relative rotation between each locking cap and the body, each weldment of the plurality of weldments being disposed between adjacent locking caps of the plurality of locking caps and joining the adjacent locking caps of the plurality of locking caps.

2. The hybrid drill bit of claim 1, wherein the first and second torque-reacting structures comprise a tongue and groove configuration.

3. The hybrid drill bit of claim 1, wherein the fastener openings are substantially round and configured for a location fit with a portion of the mechanical fastener.

4. The hybrid drill bit of claim 1, wherein a portion of at least one mechanical fastener is configured for an interference fit with a fastener opening.

5. The hybrid drill bit of claim 4, wherein the interference fit causes deformation in the fastener opening.

6. The hybrid drill bit of claim 5, wherein the deformation in the fastener opening secures the head in an axial location.

7. The hybrid drill bit of claim 1, further comprising at least one shim between the at least one rolling cutter assembly and the pocket to change an axial rolling cutter exposure.

8. The hybrid drill bit of claim 1, further comprising at least one shim between the at least one rolling cutter assembly and the pocket to change a radial rolling cutter exposure.

9. A method for manufacturing a hybrid drill bit comprising:
forming at least one rolling cutter assembly pocket in a hybrid bit body comprising a first torque-reacting structure;
providing at least one rolling cutter assembly comprising a head onto which a cutter element is rotatably coupled;
providing a second torque-reacting structure on the at least one rolling cutter assembly configured to operatively engage the first torque-reacting structure to resist relative movement between the at least one rolling cutter assembly and the bit body;
forming a plurality of mechanical fastener openings in the at least one rolling cutter assembly;
forming a plurality of mechanical fastener receptacles in the bit body corresponding to the plurality of mechanical fastener openings;
providing a plurality of mechanical fasteners fabricated from high-strength, high-fracture toughness, corrosion-resistant metal alloy configured to securely and removably couple the rolling cutter assemblies to the pockets;
providing a locking structure on a portion of at least one fastener and configured to provide an interference fit between the locking structure and an associated fastener opening;
adjustably positioning the at least one rolling cutter assembly in the pocket to establish a predetermined exposure of the at least one rolling cutter assembly;
tightening the fasteners against the at least one rolling cutter assembly to secure the at least one rolling cutter assembly to the bit body;
placing a locking cap on an exposed portion of each fastener to prevent relative rotation between the fastener and the cap;
welding at least a portion of each locking cap to prevent dislodgement of each locking cap from the respective fastener and to prevent relative rotation between each locking cap and the body; and
joining adjacent locking caps with weldments.

10. The method of claim 9, wherein the first and second torque-reacting structures comprise a tongue and groove configuration.

11. The method of claim 9, wherein the fastener openings are substantially round and configured for a location fit with a portion of the mechanical fastener.

12. The method of claim 9, wherein a portion of at least one mechanical fastener is configured for interference fit with a fastener opening.

13. The method of claim 12, wherein the interference fit causes deformation of the fastener opening.

14. The method of claim 13, wherein the deformation in the fastener opening secures the head in an axial location.

15. The method of claim 13, wherein the deformation in the fastener opening secures the head in an axial location.

16. The method of claim 12, wherein the deformation is elastic deformation.

17. The method of claim 12, wherein the deformation is plastic deformation.

18. The method of claim 9, wherein adjustably positioning the at least one rolling cutter assembly in the pocket comprises placing one or more shims between the at least one rolling cutter assembly and the pocket.

19. A hybrid drill bit comprising:
a rolling cutter assembly pocket formed into a hybrid bit body;
at least one rolling cutter assembly comprising a head onto which a cutter element is rotatably coupled;
the at least one rolling cutter assembly adjustably placed in the pocket in a predetermined position;
the head comprising a plurality of mechanical fastener openings;
a plurality of mechanical fasteners configured to securely and removably couple the at least one rolling cutter assembly to the pocket to establish a predetermined rolling cutter exposure;
a plurality of locking caps, each locking cap being configured to engage an exposed portion of a respective fastener to prevent relative rotation between the fastener and the at least one rolling cutter assembly; and
a plurality of weldments engaging at least a portion of each locking cap, the plurality of weldments configured to prevent dislodgement of each locking cap from the respective fastener and to prevent relative rotation between each locking cap and the body, each weldment of the plurality of weldments being disposed between adjacent locking caps of the plurality of locking caps and joining the adjacent locking caps of the plurality of locking caps.

20. The hybrid drill bit of claim 19, further comprising a torque-reacting structure disposed between the rolling cutter assembly and the bit body.

21. The hybrid drill bit of claim 20, wherein the torque-reacting structure comprises a tongue and groove system.

22. The hybrid drill bit of claim 19, wherein a portion of at least one mechanical fastener is configured for an interference fit with a fastener opening.

23. The hybrid drill bit of claim 22, wherein the interference fit secures the head in an axial location.

24. The hybrid drill bit of claim 19, further comprising one or more shims positioned between the at least one rolling cutter assembly and the pocket configured to create a predetermined axial and/or radial exposure of the at least one rolling cutter assembly.

* * * * *